(12) United States Patent
Roddenberry

(10) Patent No.: US 11,137,104 B1
(45) Date of Patent: Oct. 5, 2021

(54) QUICK CONNECT/RELEASE CAMERA MOUNT APPARATUS AND METHOD

(71) Applicant: Jeffrey Scott Roddenberry, Gulf Breeze, FL (US)

(72) Inventor: Jeffrey Scott Roddenberry, Gulf Breeze, FL (US)

( * ) Notice: Subject to any disclaimer, the term of this patent is extended or adjusted under 35 U.S.C. 154(b) by 185 days.

(21) Appl. No.: 16/720,332

(22) Filed: Dec. 19, 2019

Related U.S. Application Data

(60) Provisional application No. 62/783,256, filed on Dec. 21, 2018.

(51) Int. Cl.
| | | |
|---|---|---|
| *F16M 11/04* | (2006.01) | |
| *G03B 17/56* | (2021.01) | |
| *F16M 13/02* | (2006.01) | |

(52) U.S. Cl.
CPC ........ *F16M 11/041* (2013.01); *F16M 13/022* (2013.01); *G03B 17/561* (2013.01)

(58) Field of Classification Search
USPC ........................................ 396/419; 248/187.1
See application file for complete search history.

(56) References Cited

U.S. PATENT DOCUMENTS

| | | | |
|---|---|---|---|
| 8,448,546 B2 * | 5/2013 | Johnson ................... | F21V 21/36 81/53.12 |
| 9,133,978 B2 | 9/2015 | Roddenberry | |
| 9,593,803 B1 | 3/2017 | Roddenberry | |
| 2008/0189870 A1 * | 8/2008 | Dayton ..................... | B08B 1/04 7/167 |
| 2012/0294672 A1 * | 11/2012 | Hicks ..................... | F16M 11/04 403/299 |
| 2014/0044428 A1 * | 2/2014 | Cuddeback ........ | F16M 11/2021 396/428 |
| 2015/0076184 A1 * | 3/2015 | Achenbach .......... | G03B 17/561 224/181 |
| 2017/0108760 A1 * | 4/2017 | Achenbach ........ | F16M 11/2014 |

* cited by examiner

*Primary Examiner* — Clayton E. LaBalle
*Assistant Examiner* — Warren K Fenwick
(74) *Attorney, Agent, or Firm* — J. Nevin Shaffer, Jr.

(57) ABSTRACT

A quick connect/release camera mount apparatus and method includes an attachment device with a central body where the central body includes a first end and a second end. A quick connect/release coupler is provided on the first end and an attachment arm on the second end of the central body where the attachment arm includes a retainer device and a camera connection device is configured to connect with and be retained by the retainer device.

20 Claims, 10 Drawing Sheets

QUICK CONNECT/RELEASE CAMERA MOUNT APPARATUS AND METHOD

CROSS REFERENCE TO RELATED APPLICATION

This application claims the benefit of previously filed U.S. provisional patent application No. 62/783,256 filed Dec. 21, 2018 for a "Quick Connect/Release Camera Mount Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to an improved camera mount apparatus and method. According to a preferred embodiment a quick connect/release camera mount includes an attachment device with a central body where the central body includes a first end and a second end. A quick connect/release coupler is provided on the first end and an attachment arm on the second end of the central body where the attachment arm includes a retainer device and a camera connection device is configured to fit within and be retained by the retainer device.

BACKGROUND OF THE INVENTION

By way of example only and not by limitation, many hunters choose to film their own hunt. However, self-filmed hunts can be challenging, especially for those who hunt from an elevated stand position such as a tree. In an effort to remain hands free, the hunter typically secures his camera by way of a mounting device and usually connects that camera/mounting device to a man-made, metal structure such as a tree stand or bow holder. Generally a straight clamp, C-clip, or vice grip style of mount is used when securing the camera to either a square or rounded pipe which make up both tree stand and bow holder structures. However, making secure connections to these forms can often prove difficult due to the overall attachment method shared by each style of mount. Each prior art mount of which the Applicant is aware shares a common problem because it relies upon tension applied to a rubberized gripping surface which basically is designed to pinch the metal bar with enough pressure to keep and hold the camera in place. A good connection is hard to make due to differing surfaces such as with rounded pipe, or small surface areas of which to grip. Add the weight of a camera, especially a mid size to larger camera, and these connections will often slip and fail.

None of the prior art of which Applicant is aware, including devices shown in Prior Art FIGS. 1-11, are the same structurally such that a rock solid connection can be made and none are as easy and economical to install and operate as Applicant's improved device.

Thus, there is a need in the art for an apparatus and method that addresses the aforementioned problems in a manner and with an apparatus that is robust and flexible so as to accommodate a full spectrum of mounting surface shapes and dimensions.

It therefore is an object of this invention to provide an improved quick connect/release camera mount apparatus and method for use in hands free operation of cameras that is not complicated or difficult to use.

SUMMARY

Accordingly, a quick connect/release camera mount apparatus and method according to a preferred embodiment consists of an attachment device with a central body where the central body includes a first end and a second end. A quick connect/release coupler is provided on the first end and an attachment arm on the second end of the central body where the attachment arm includes a retainer device and a camera connection device is configured to fit within and be retained by the retainer device.

In one aspect, the retainer device is a hole in the attachment arm where, in combination with a securing device, the securing device is configured to pass through the hole and connect with the camera connection device.

In another aspect, the camera connection device includes a threaded bolt where the threaded bolt is configured for releasable connection with a camera.

In a further aspect the invention further includes a washer configured for placement between the camera connection device and the attachment arm and a lock washer for placement between the attachment arm and the securing device.

In yet another aspect, the invention further includes a base attachment device with a first end and a second end where the base attachment device is configured for attachment to an object on the first end and for attachment with the quick connect/release coupler on the second end of the base attachment device.

In one aspect, the first end of the base attachment device is a threaded screw and in other aspects the threaded screw is wood screw and a metal screw.

In another embodiment, a quick connect/release camera apparatus consists of an attachment device with a central body where the central body includes a first end and a second end. A quick connect/release coupler on the first end and an attachment arm on the second end of the central body where the attachment arm includes a retainer device and where the retainer device is a hole in the attachment arm where, in combination with a securing device, the securing device is configured to pass through the hole and connect with the camera connection device. A camera connection device configured to fit within and be retained by the retainer device and a base attachment device where the base attachment device includes a first end and a second end and is configured for attachment to an object at the first end and for attachment with the quick connect/release coupler on the second end of the base attachment device.

In one aspect, the first end of the base attachment device is a threaded screw, in another aspect, the threaded screw is wood screw, and in another aspect, the threaded screw is a metal screw.

In a further aspect, the threaded screw is selected from a group consisting of: wood screws and metal screws.

In another embodiment, a quick connect/release camera method consists of:

a. providing an attachment device with a central body where the central body includes a first end and a second end; a quick connect/release coupler on the first end and an attachment arm on the second end of said central body where the attachment arm includes a retainer device and where the retainer device is a hole in said attachment arm where, in combination with a securing device, the securing device is configured to pass through the hole and connect with a camera connection device where the camera connection device is configured to connect with and be retained by the retainer device; and a base attachment device where the base attachment device includes a first end and a second end and is configured for attachment to an object at the first end and for attachment with the quick connect/release coupler on the second end of the base attachment device; and b. connecting the securing device with the camera connection device.

In one aspect, the method further includes attaching the first end of the base attachment to another object and connecting the quick connect/release coupler to the second end of the base attachment device.

In another aspect, the method further includes attaching a camera to the camera connection device.

In a further aspect, the first end of the base attachment device is a threaded screw.

In other aspects, the threaded screw is wood screw or the threaded screw is a metal screw.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
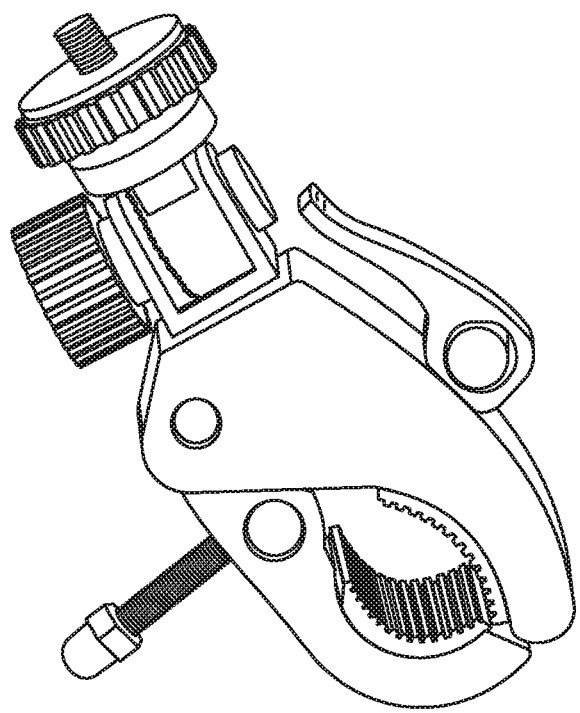
FIGS. 1-11 illustrate Prior Art camera attachment devices.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain steps are conducted in parallel or independent, with other steps, to the extent that the steps are not dependent upon each other. Thus, the specific order of steps described herein is not to be considered implying a specific sequence of steps to perform the method. In alternative embodiments, one or more steps may be implemented by a user assisted process and/or manually. Other alterations or modifications of the above methods are also contemplated. For example, further insubstantial approximations of the steps are also considered within the scope of the method described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 2:
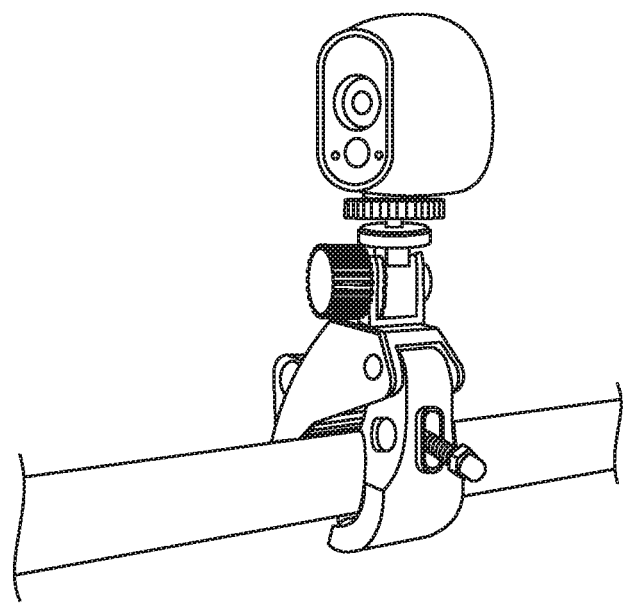

Referring to FIGS. 1-11, these figures all illustrate Prior Art devices for attaching cameras for hands free use are set forth. FIG. 1 shows a complicated gripping device clearly designed for gripping rounded surfaces and FIG. 2 shows the prior art device attached to a tubular structure and with a camera attached.

Figure 3:
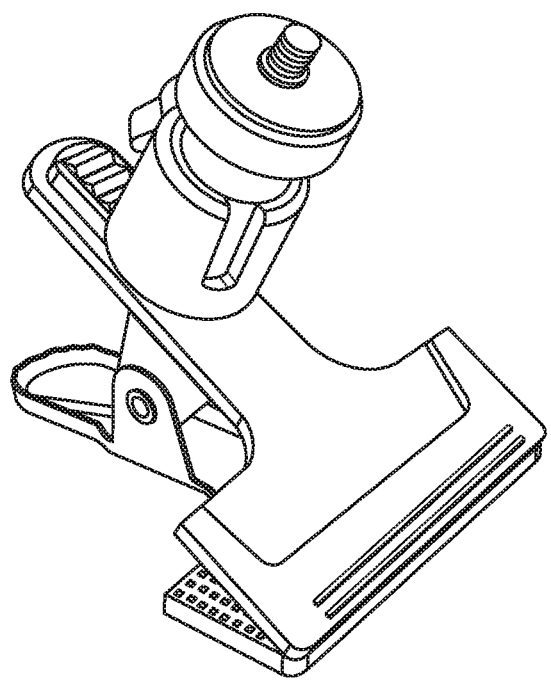
Figure 4:
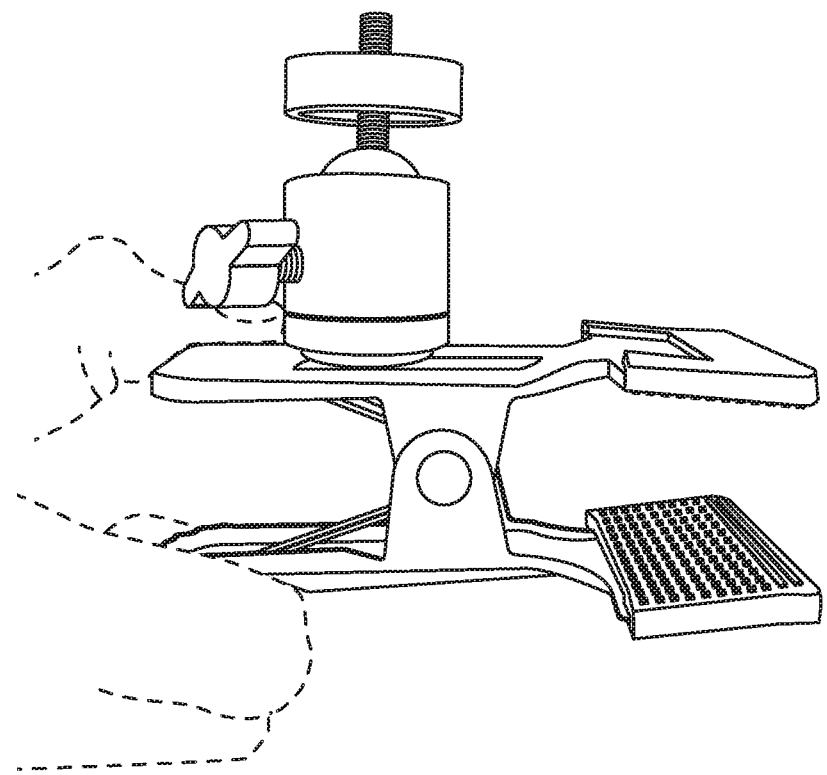

FIG. 3 shows a flat spring loaded clamp Prior Art attachment apparatus and FIG. 4 shows the FIG. 3 device held in an open position and clearly showing it is best suited for attachment with a non-rounded surface.

Figure 5:
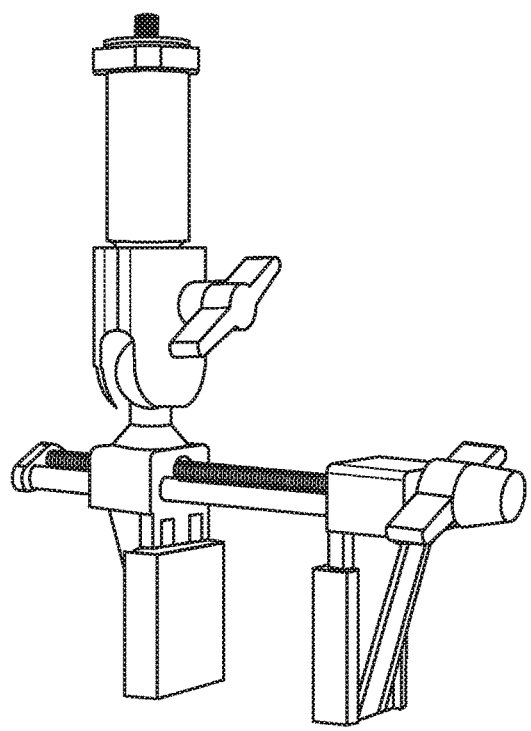
Figure 6:
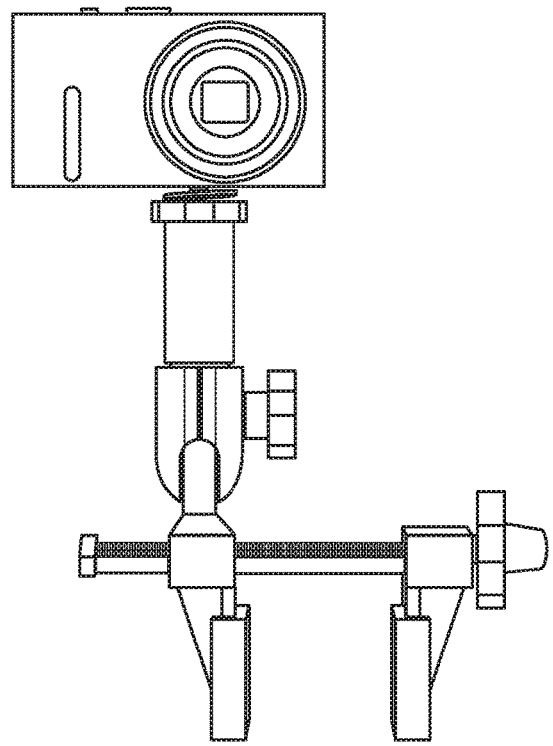

FIG. 5 shows a complicated Prior Art attachment structure with opposing clamp surfaces for use in attachment to a structure in some manner and FIG. 6 shows the Prior Art device with a camera attached.

Figure 7:
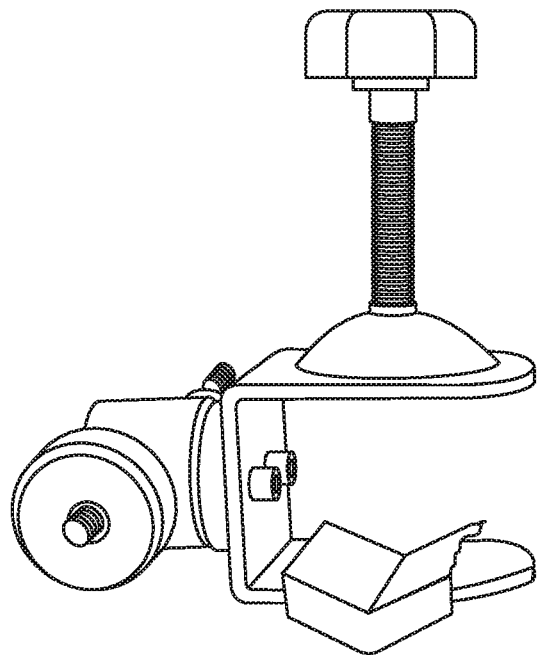
Figure 8:
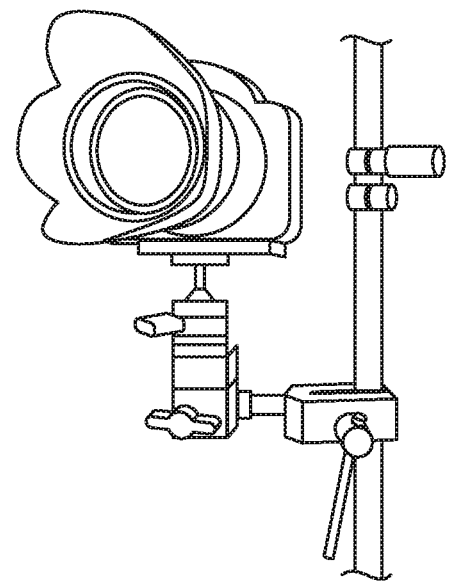

FIG. 7 shows a Prior Art device with a simple clamp and angled clamping surface for use with attaching the device in place and FIG. 8 shows it with a camera attached.

Figure 9:
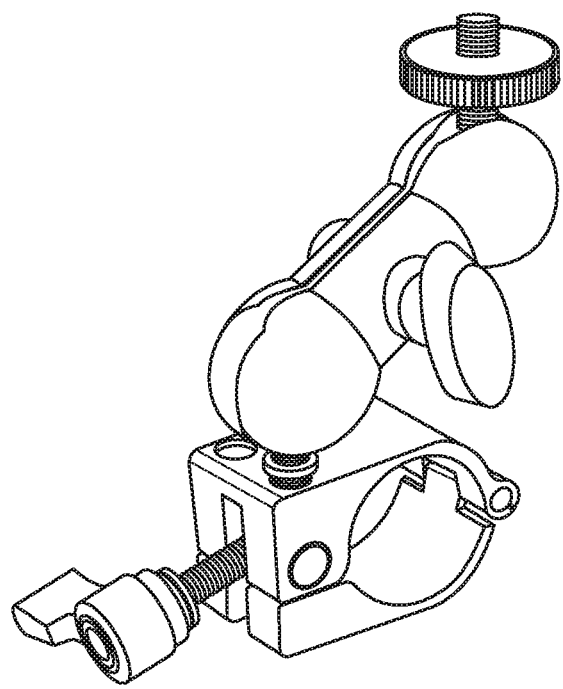
Figure 10:
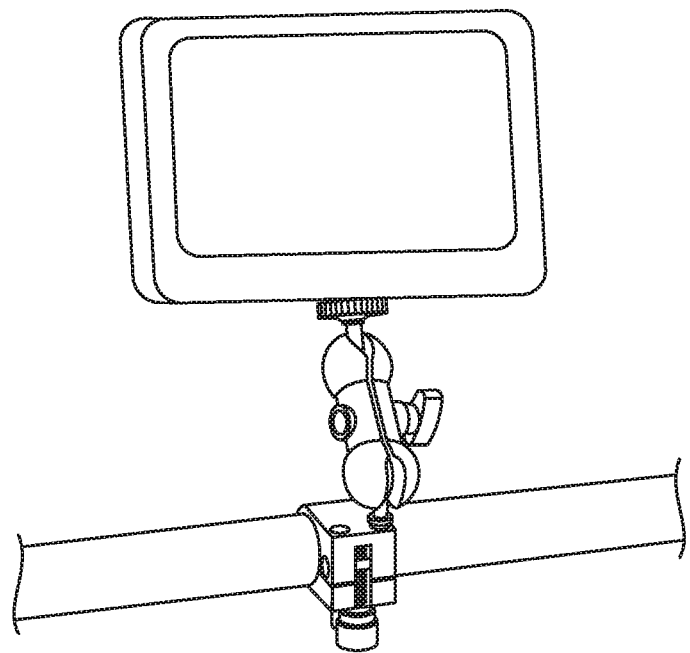

FIG. 9 shows a complicated Prior Art device configured for attachment to rounded surfaces and FIG. 10 shows this device attached to a tubular structure and with a camera attached.

Figure 11:
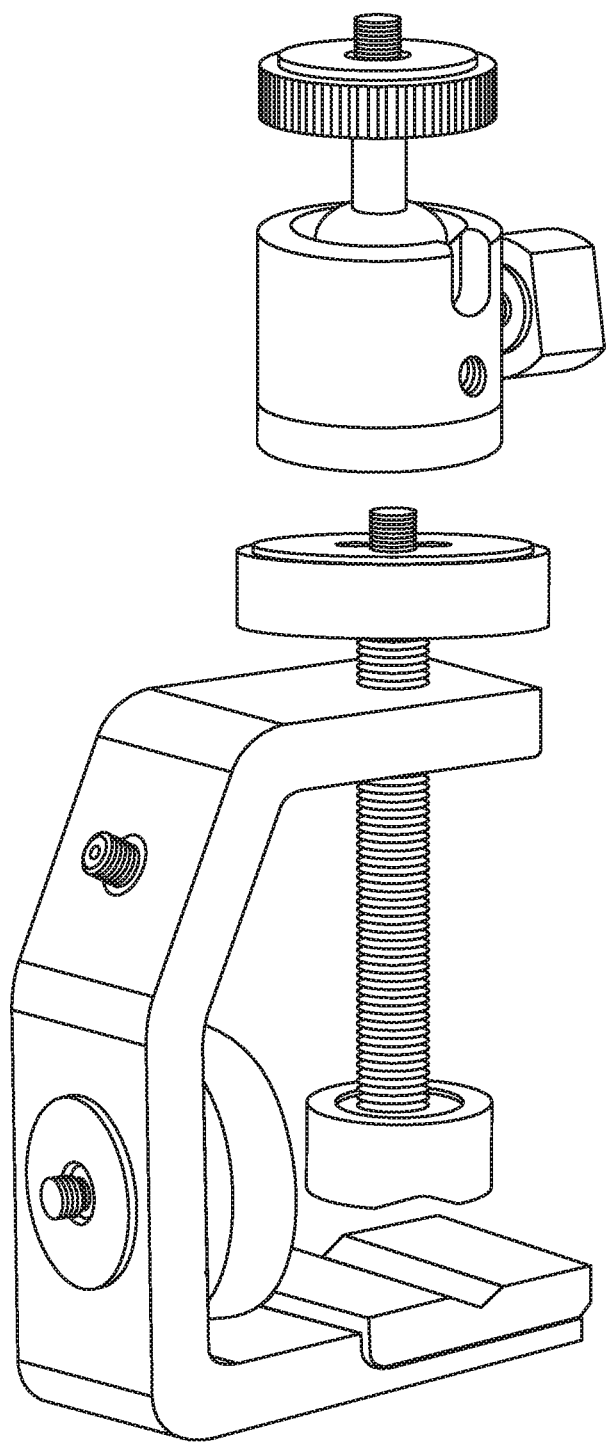

FIG. 11 is yet another Prior Art device for use in clamping a camera attachment to non-rounded surface.

Figure 12:
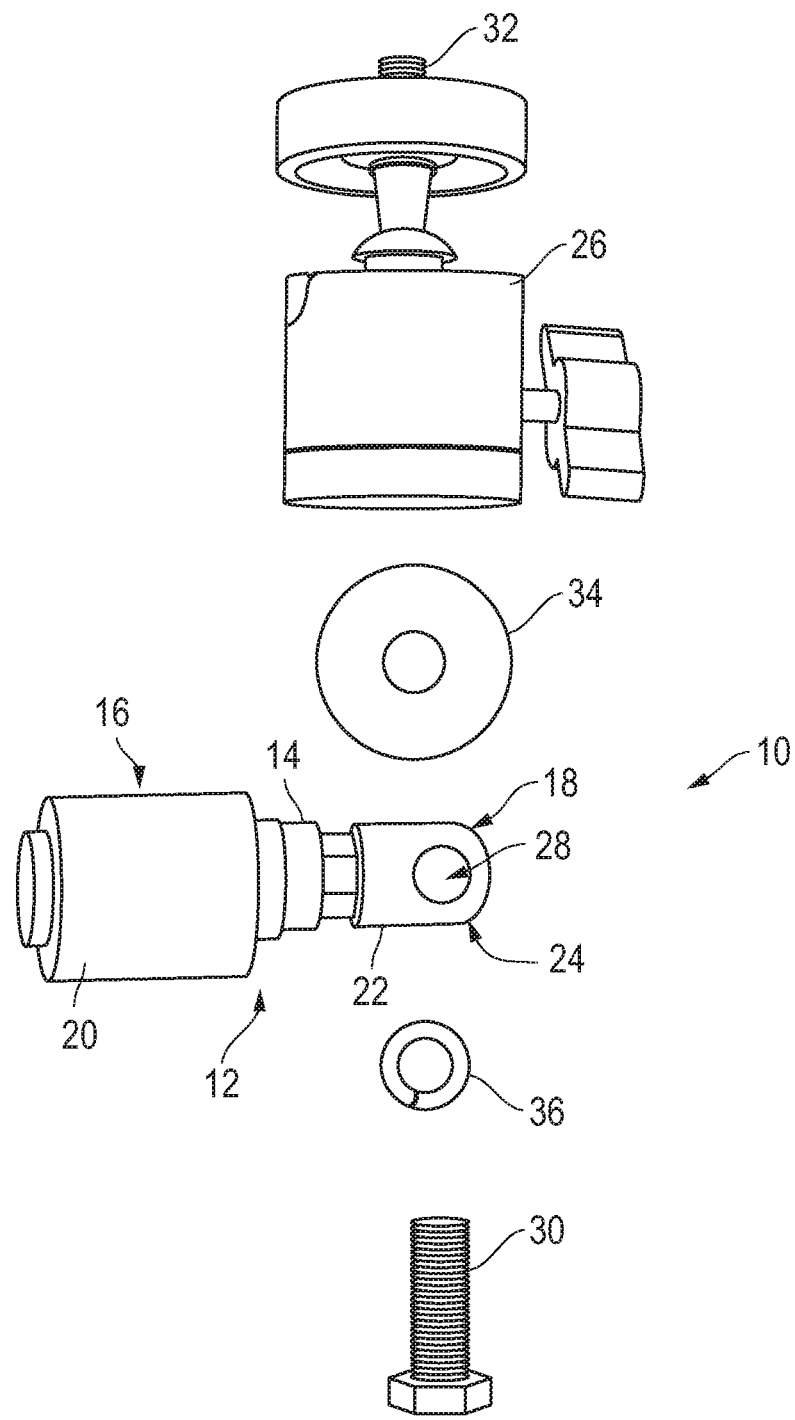
FIG. 12 is a side exploded top view of the quick connect/release apparatus of the present invention.
Figure 13:
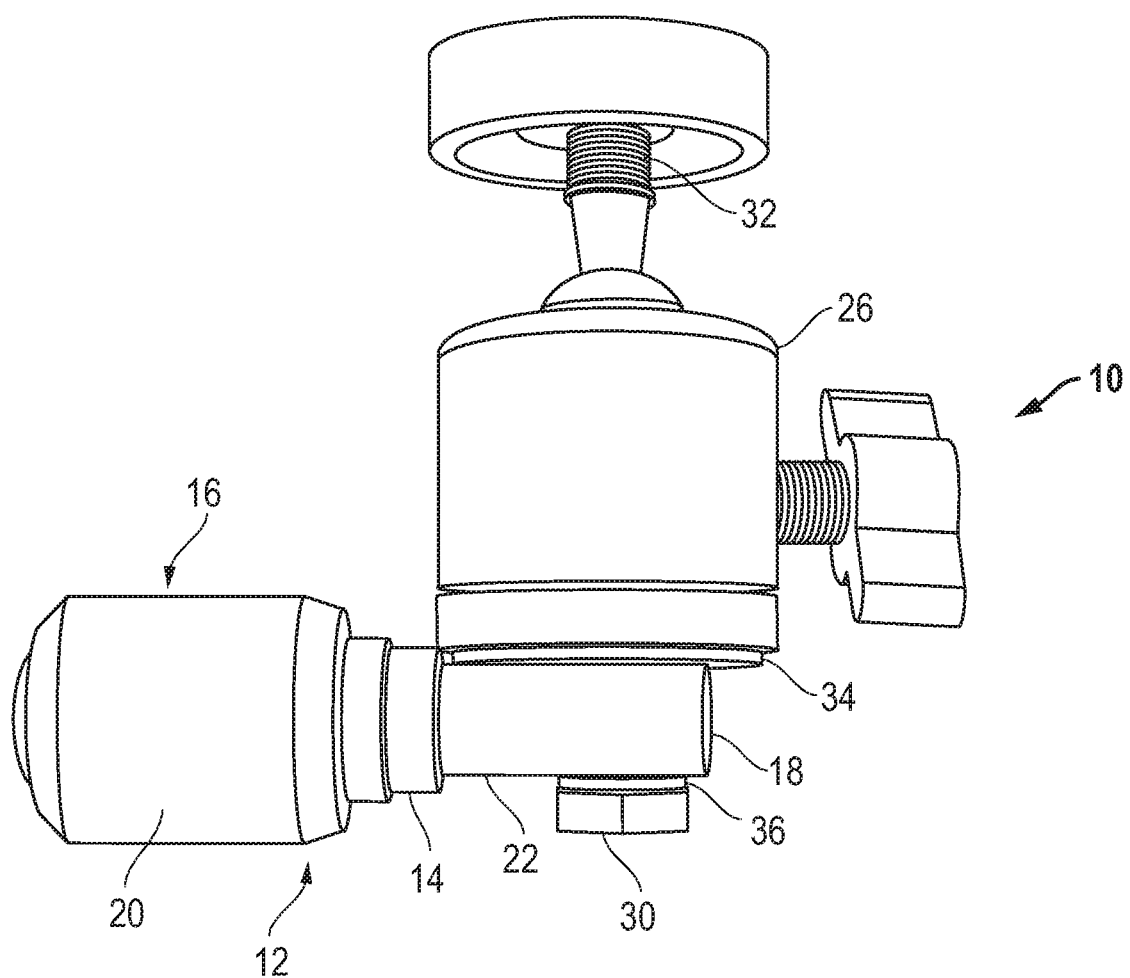
FIG. 13 is a side view of the invention of FIG. 12 in the assembled position.

One embodiment of the present invention is illustrated by way of example in FIGS. 12-15. Referring to FIGS. 12 and 13, quick connect/release camera apparatus 10 is shown to consist, in a preferred embodiment, of an attachment device 12 with a central body 14 where the central body 12 includes a first end 16 and a second end 18. A quick connect/release coupler 20 is provided on the first end 16. An attachment arm 22 is provided on the second end 18 of the central body 12 where attachment arm 22 includes a retainer device 24. A camera connection device 26 is provides and configured to connect with and be retained by the retainer device 24.

In one aspect, the retainer device 24 is a hole 28 in the attachment arm 22 where, in combination, the securing device 30 is configured to pass through the hole 28 and connect with the camera connection device 26.

In another aspect, the camera connection device 26 includes a threaded bolt 32 where the threaded bolt 32 is configured for releasable connection with a camera (not shown).

In one aspect, the invention further includes a washer 34 configured for placement between the camera connection device 26 and the attachment arm 22 and a lock washer 36 for placement between the attachment arm 22 and the securing device 30.

Figure 14:
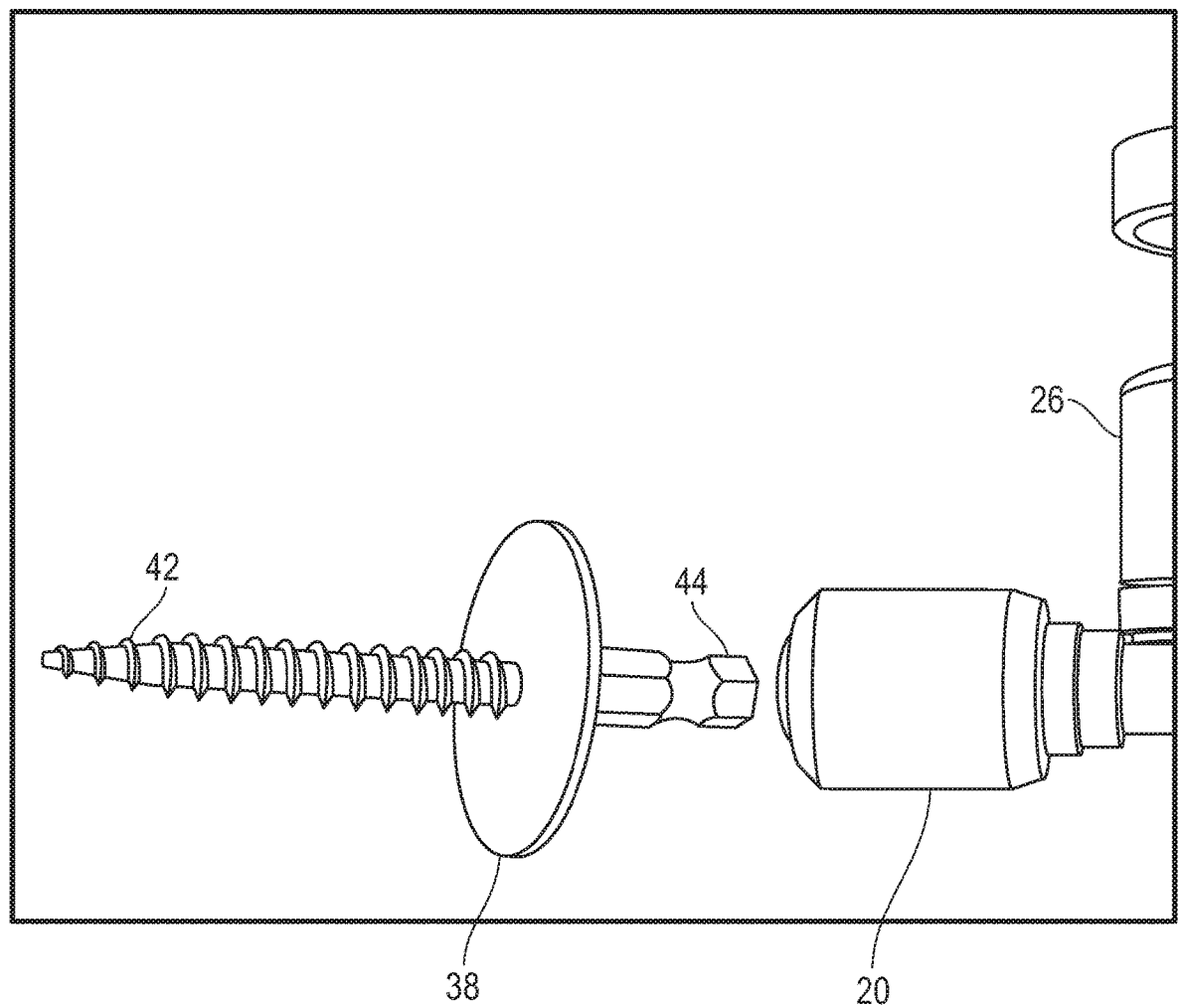
FIG. 14 is a side view of the invention of FIG. 12 shown ready for attachment with a base attachment device.
Figure 15:
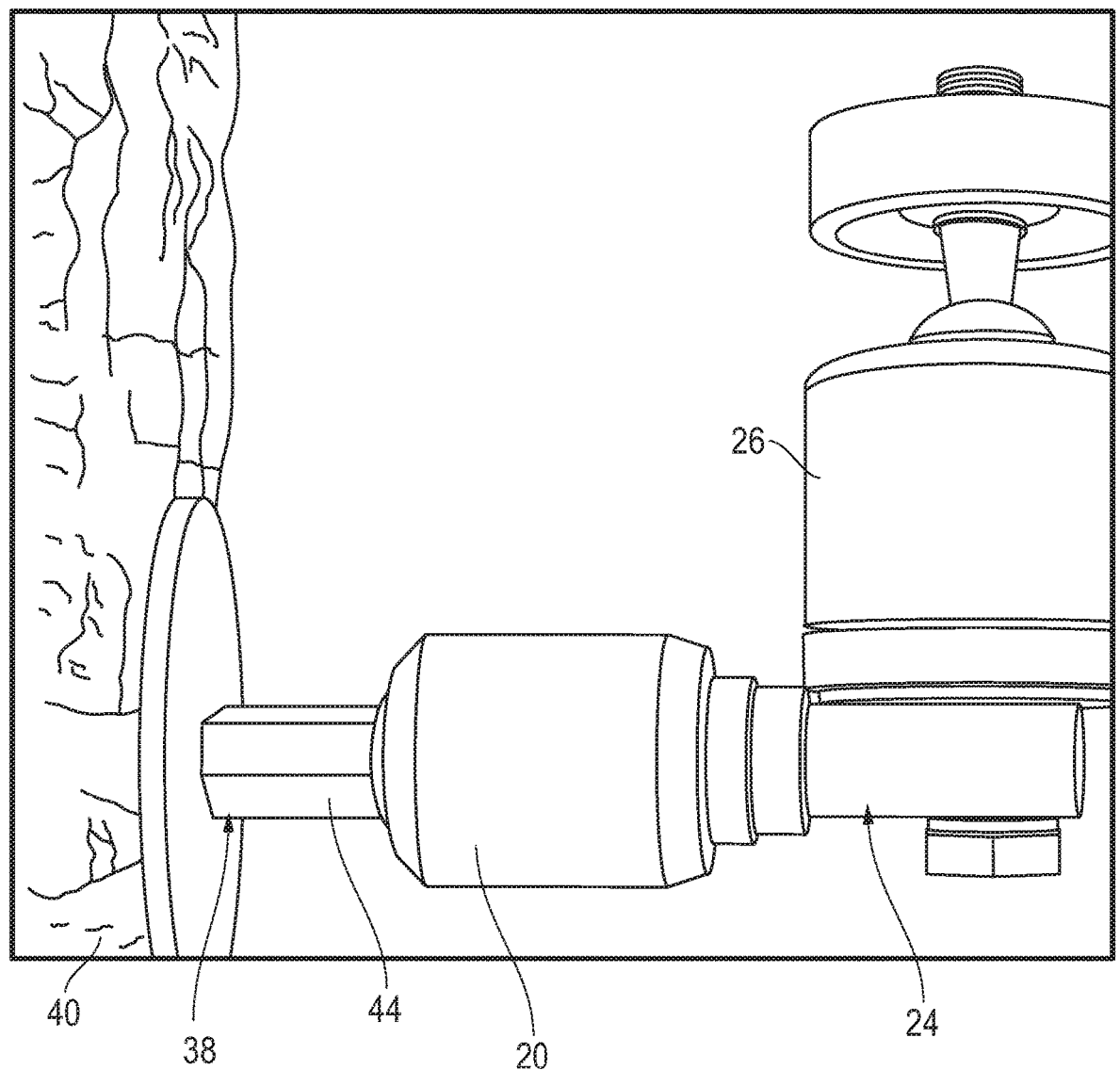
FIG. 15 is a side view of the invention of FIG. 14 shown connected with the base attachment device which in turn is connected with an object (tree).

Referring now to FIGS. 14 and 15, in yet another aspect, in a preferred embodiment, the invention further includes a base attachment device 38 with a first end 42 and a second end 44 where the base attachment device 38 is configured for attachment to an object (such as a tree 40 for example only and not by limitation as shown in FIG. 15) on the first end 42 and for attachment with the quick connect/release coupler 20 of the base attachment device 38 on the second end 44 as illustrated. In one embodiment, base attachment device 38 has a threaded screw first end 42 such that it can be screwed into tree 40 or even a metal support, for example only and not by limitation. Certainly, first end 42 of base attachment device 38 can be in any useful form such as a threaded bolt.

By way of further explanation, the present invention is designed to provide a rock solid connection. The mount's secure connection is made possible by utilizing quick connect/release technologies which are found throughout Applicant's patented Morph Pro brand Bow Hanger System (U.S. Pat. No. 9,593,803 B1). By utilizing a quick connect/release coupler, the present invention, the Morph Pro brand Camera Mount, may also be applied to any hexagonal stud (base attachment stud 38) that's made part of all Morph Pro brand Bow Hanger products. Each bit or stud not only serves to support the coupler/mount 10 but also provides an area in which the coupler 20 can lock into place; thereby insuring a secure connection.

The Morph Pro brand Bow Hanger System also makes available quick connect/release screws and bolts. Our patented screw/bolt, base attachment stud 38, (U.S. Pat. No. 9,133,978,B2) is also designed with a hexagonal mounting stud that's meant to receive the camera mount coupler 20 as well. These Morph Pro brand fasteners can be affixed to most any square tubed tree stand, shooting house wall, or tree 40. This unique concept provides hunters with numerous options in which to better secure their camera for the hunt.

Advantages Over Prior Structures or Methods

The traditional Prior Art clamp-to camera mount is a relatively simple device made complicated in application. The device features a threaded ¼ inch screw which is usually affixed at the top of the unit and serves as an universal mounting post for an array of cameras and other recording equipment. The mount typically incorporates some sort of swiveling mechanism so the user can maneuver and set the camera/mount at a preferred angle. The mount is completed with some sort of connective apparatus which as shown in the Prior Art figures, is typically a clamp-to attachment apparatus. The clamp-to apparatus can include various clamp styles such as straight clip, C-clip, or vice grip style. The mount is made in different styles to better fit differing attachable structures. For example, the C-clip is made for use with rounded pipe; the straight clip is made to use with long thin structures; and the vice grip clamp is better suited for thicker structures such as square pipe. Regardless of style, clamp-to devices tend to rely on tension and a rubberized gripping surface to secure and hold the camera/mount in place.

Once a particular Prior Art style is purchased, the hunter needs to attached his camera and find a suitable place in which to clamp the camera/mount. When hunting from an elevated stand position such as a tree, the more suitable structure is usually the square or round tubing of the hunter's tree stand or bow holder. For most hunters, however, attaching the camera/mount isn't as simple as it seems. The user must first utilize two hands to accomplish the task. One hand is used to position the clamp apparatus over the most suitable clamping area; while the other hand must simultaneously lock the tension lever or turn the tension knob of the device in an effort to tighten the clamp onto the receiving structure. Needless to say this is a cumbersome process and can also be somewhat dangerous considering this task typically takes place twenty to thirty feet above the ground.

Although consumers may purchase a particular style of camera mount to best suite their need, confidence in securing the mount is often questionable considering the interactive parts of the clamp aren't specifically designed or exactly sized to fit and grip whatever the available mounting structure may be. Even with the camera mounted in place, the user often finds it difficult to completely trust the connection made. This lack of trust is no doubt due to the variables involved between the mount and the mounting structure. Furthermore, the trust factor is often amplified when you consider the high cost of today's camera equipment.

By contrast, the present invention not only allows for connections to be made quicker and easier as compared to that of a traditional camera mount but it also insures the user that his equipment will stay safe and secure throughout the duration of the hunt. This considerable improvement is due to the use of quick connect/release technologies which can be found throughout the mount's related Morph Pro brand bow hanger system (U.S. Pat. No. 9,593,803,B1). As part of its associated system, the Morph Pro brand camera mount can be easily attached to any hexagonal stud found within the bow hanger itself or to any related Morph Pro brand bolt or screw (U.S. Pat. No. 9,133,978 B2). Each bit or stud not only serves to support the coupler/camera mount but also provides an area in which the coupler can lock into place thus insuring a secure hold.

The camera mount of the present invention, in a preferred embodiment, features a threaded ¼ inch screw that is located at the top of the unit. The universal screw is designed to receive cameras and other recording equipment. The camera mount of the present invention also favors traditional mounts because it incorporates a swiveling mechanism of which can be set to position the camera. However, the connective apparatus of the camera mount of the present invention drastically differs from that of a traditional camera mount.

The present camera mount, according to a preferred embodiment, utilizes a hexagonal quick connect coupler that can slide over any hexagonal stud. The quick chuck or quick connect coupler features a hexagonal receiver encased by a spring and ball loaded collar. Disengaging the collar forces the chuck's ball bearing components through openings in it's hexagonal tube. When mounted onto a stud, the ball bearing components will occupy the void found within the stud's fluted head and effectively lock the chuck in place. Re-engaging the collar disables the locking capability of the coupler thus allowing the coupler/camera mount to be easily removed.

In summation, the present invention offers the user a quick and easy solution to attaching and securing one's pricy camera equipment while decreasing the risk to the camera equipment from losing its connection and falling to the ground. The present camera mount is considered an addition to Applicant's Morph Pro brand bow hanger system and is designed for use with Applicant's Morph Pro brand bow hanger as well as it's associated base mounts which include Applicant's Morph Pro brand bolts and screws.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A quick connect/release camera apparatus comprising:
   a. an attachment device with a central body wherein the central body includes a first end and a second end;

b. a quick connect/release coupler on the first end and an attachment arm on the second end of said central body wherein said attachment arm includes a retainer device; and c. a camera connection device configured to connect with and be retained by said retainer device.

2. The apparatus of claim 1 wherein said retainer device is a hole in said attachment arm wherein, in combination with a securing device, the securing device is configured to pass through the hole and connect with the camera connection device.

3. The apparatus of claim 2 further including a washer configured for placement between said camera connection device and said attachment arm and a lock washer for placement between said attachment arm and the securing device.

4. The apparatus of claim 1 wherein said camera connection device includes a threaded bolt wherein said threaded bolt is configured for releasable connection with a camera.

5. The apparatus of claim 1 further including a base attachment device wherein said base attachment device includes a first end and a second end and is configured for attachment to an object at the first end and for attachment with said quick connect/release coupler on the second end of said base attachment device.

6. The apparatus of claim 5 wherein the first end of the base attachment device is a threaded screw.

7. The apparatus of claim 6 wherein the threaded screw is wood screw.

8. The apparatus of claim 6 wherein the threaded screw is a metal screw.

9. The apparatus of claim 6 wherein the threaded screw is selected from a group consisting of: wood screws and metal screws.

10. A quick connect/release camera apparatus comprising:
a. an attachment device with a central body wherein the central body includes a first end and a second end;
b. a quick connect/release coupler on the first end and an attachment arm on the second end of said central body wherein said attachment arm includes a retainer device and wherein said retainer device is a hole in said attachment arm wherein, in combination with a securing device, the securing device is configured to pass through the hole and connect with the camera connection device;
c. a camera connection device configured to connect with and be retained by said retainer device; and d. a base attachment device wherein said base attachment device includes a first end and a second end and is configured for attachment to an object at the first end and for attachment with said quick connect/release coupler on the second end of said base attachment device.

11. The apparatus of claim 10 wherein the first end of the base attachment device is a threaded screw.

12. The apparatus of claim 11 wherein the threaded screw is wood screw.

13. The apparatus of claim 11 wherein the threaded screw is a metal screw.

14. The apparatus of claim 11 wherein the threaded screw is selected from a group consisting of: wood screws and metal screws.

15. A quick connect/release camera method consisting of:
a. providing an attachment device with a central body wherein the central body includes a first end and a second end; a quick connect/release coupler on the first end and an attachment arm on the second end of said central body wherein said attachment arm includes a retainer device and wherein said retainer device is a hole in said attachment arm wherein, in combination with a securing device, the securing device is configured to pass through the hole and connect with a camera connection device where the camera connection device is configured to connect with and be retained by said retainer device; and a base attachment device wherein said base attachment device includes a first end and a second end and is configured for attachment to an object at the first end and for attachment with said quick connect/release coupler on the second end of said base attachment device; and
b. connecting the securing device with the camera connection device.

16. The method of claim 15 further including attaching the first end of the base attachment to another object and connecting the quick connect/release coupler to the second end of the base attachment device.

17. The method of claim 16 further including attaching a camera to the camera connection device.

18. The method of claim 15 wherein the first end of the base attachment device is a threaded screw.

19. The method of claim 18 wherein the threaded screw is wood screw.

20. The method of claim 18 wherein the threaded screw is a metal screw.

* * * * *